(12) United States Patent
Wang

(10) Patent No.: US 6,640,270 B1
(45) Date of Patent: Oct. 28, 2003

(54) TERMINAL CONNECTION BOX AND PLUG

(75) Inventor: Jane Wang, Taipei (TW)

(73) Assignee: Ulan Co., Ltd., Taipei (TW)

( * ) Notice: Subject to any disclaimer, the term of this patent is extended or adjusted under 35 U.S.C. 154(b) by 360 days.

(21) Appl. No.: 09/598,262

(22) Filed: Jun. 21, 2000

(51) Int. Cl.[7] .............................................. G06F 13/12
(52) U.S. Cl. ............................ 710/69; 710/33; 439/14; 439/135; 439/76; 370/419; 370/463; 370/487; 370/386; 348/14; 379/93; 395/200
(58) Field of Search ...................... 710/69, 33; 439/14, 439/135, 76; 348/14; 379/93; 370/386, 419, 463, 487; 395/200

(56) References Cited

U.S. PATENT DOCUMENTS

| | | | |
|---|---|---|---|
| 6,336,218 B1 * | 1/2002 | Kim .............................. | 725/58 |
| 6,363,448 B1 * | 3/2002 | Waller et al. ................ | 710/312 |
| 6,381,747 B1 * | 4/2002 | Wonfor et al. ............... | 725/104 |
| 6,404,276 B1 * | 6/2002 | Liu .............................. | 327/553 |
| 6,452,923 B1 * | 9/2002 | Gerszberg et al. ........... | 370/352 |
| 6,456,340 B1 * | 9/2002 | Margulis ..................... | 348/745 |

* cited by examiner

Primary Examiner—Jeffrey Gaffin
Assistant Examiner—Niketa Patel
(74) Attorney, Agent, or Firm—Troxell Law Office PLLC

(57) ABSTRACT

A terminal connection box for connecting a computer and an external peripheral device. The terminal connection box comprises: a plurality of side walls forming a housing, an enhanced signal circuit located inside the housing for converting and boosting signals, a first cable connecting the enhanced signal circuit and the computer, and a 1394 type plug connecting the enhanced signal circuit and the external peripheral device. The 1394 type signals coming from the external peripheral device are boosted and converted by the enhanced signal circuit so as to be compatible to the computer. Signals coming from the computer are boosted and converted into 1394 type signals by the enhanced signal circuit so as to be compatible to the external peripheral device. Such that the external peripheral device and the computer can perform bi-directional intercommunications with their signal boosted by the enhanced signal circuit.

6 Claims, 5 Drawing Sheets

TERMINAL CONNECTION BOX AND PLUG

FIELD OF THE INVENTION

This invention relates to an improvement for terminal connection box and plug that uses an enhanced signal circuit to connect a 1394 type-plug for transmitting data signal at fast speed.

BACKGROUND OF THE INVENTION

This invention is to improve the conventional terminal connection box that was developed by the same applicant and was filed as Taiwan patent application Ser. No. 86210961. The conventional terminal connection box has selected configuration in a box to connect plug, terminal socket and external cable to facilitate connection and disconnection of terminal and plugs between a computer and peripheral devices.

FIG. 1 shows a convention terminal connection box 10 which includes a holding means 20 and a terminal socket 31 located in a rectangular box. On each side wall, there is a gate opening 101 wedge with a sliding means 12 which may be inserted into or pulled out from the gate opening 101. The sliding means 12 may include a baffle 11. One of the baffles has an opening 111 to receive an external cable 51 into the box 10.

The holding means 20 includes a holding member 21 and a plurality of trough holding slots 22 each may engage with a plug 40. The holding slots 22 further have a terminal socket 31 for latching the plug 40. And there is a third holding slot 223 for fastening the plug 40 as depicted in the Taiwan patent application Ser. No. 86210961.

FIG. 2 shows another conventional terminal connection box 10 which is largely constructed like the one shown in FIG. 1. However in the holding means 20, there are a plurality of leads 52 which may establish connection with the external cable 51 through a connection means 32. The connection means 32 includes a plurality of the notch slots. Each notch slot has a screw 323 to fasten a metallic upper plate 321 against a lower plate 322 in the slot. One lead 52 and one terminal from the external cable 51 are clamped between the upper plate 321 and lower plate 322 for establishing electric connection.

While the conventional connection boxed set forth above may enable a plurality of peripheral device to connect or disconnect with the computer easily, signal transmission intensity will diminish when the peripheral devices are located at a long distance from the computer. There is still room for improvement.

SUMMARY OF THE INVENTION

It is an object of this invention to provide an improvement for terminal connection box and plug that has an enhanced signal circuit to boost signal intensity so that data and signal transmission between the peripherals, particularly those use USB and 1394 type connectors, may remain sufficiently strong even at a long distance from the computer to ensure smooth operation.

In one aspect, the enhanced signal circuit uses a data conversion processor to process data conversion. As input data and data under transmission may be different, the conversion is needed for proper data transmission.

In another aspect, the enhanced signal circuit includes a process circuit, a lock phase circuit, a data receiving unit and an output/input port connecting with the data conversion processor. Input signals are processed. Output signals are generated and delivered to selected terminals to complete signal transmission.

In yet another aspect, the terminal connection box includes a plurality of terminal plugs for connecting with a plurality of peripherals with the computer through the enhanced signal circuit.

BRIEF DESCRIPTION OF THE DRAWINGS

The invention, as well as its may advantages, may be further understood by the following detailed description and drawings in-which.

DETAILED DESCRIPTION OF THE PREFERRED EMBODIMENT

Figure 1:
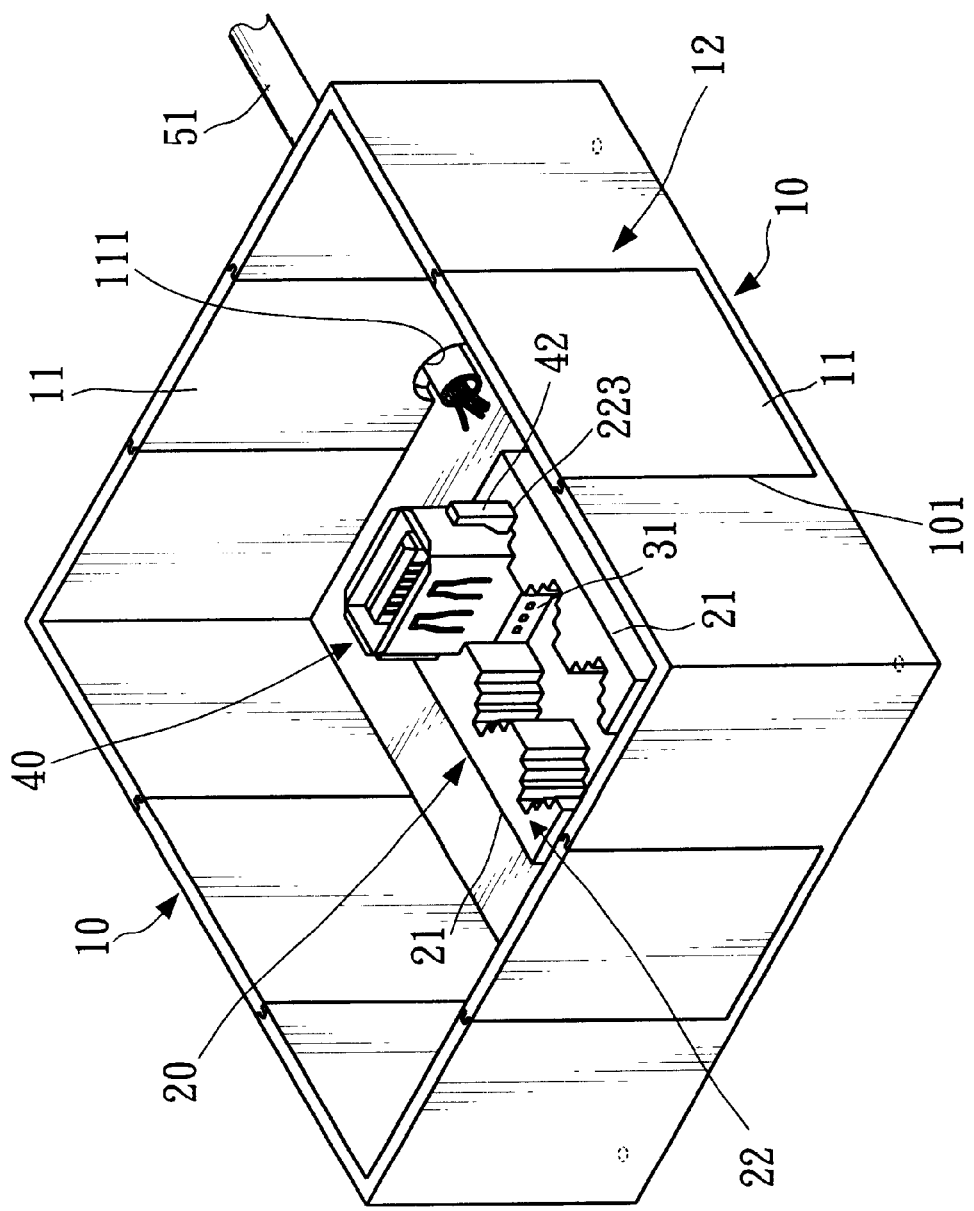
FIG. 1 is a perspective view of a conventional terminal connection box.
Figure 2:
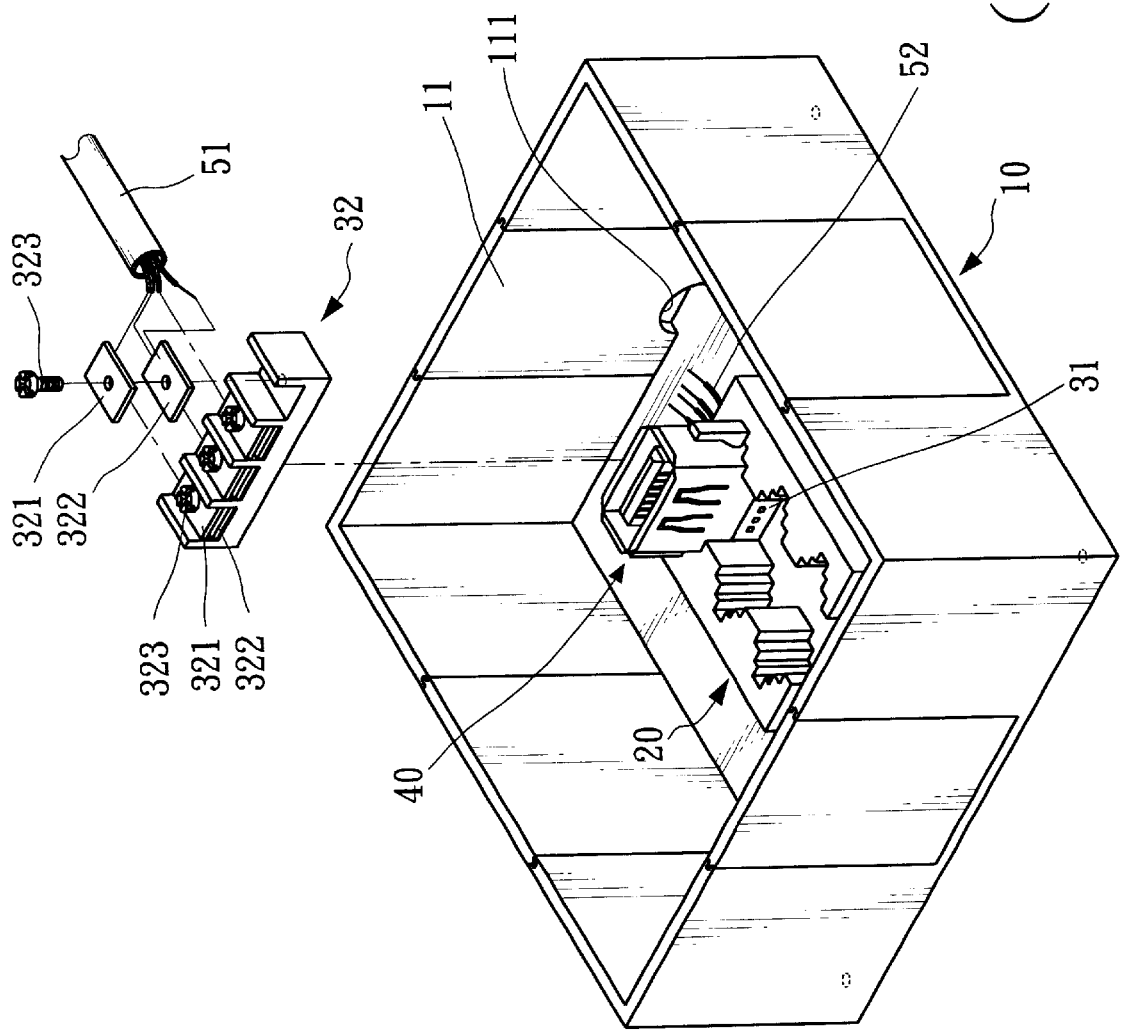
FIG. 2 is a perspective view of another conventional terminal connection box.
Figure 3:
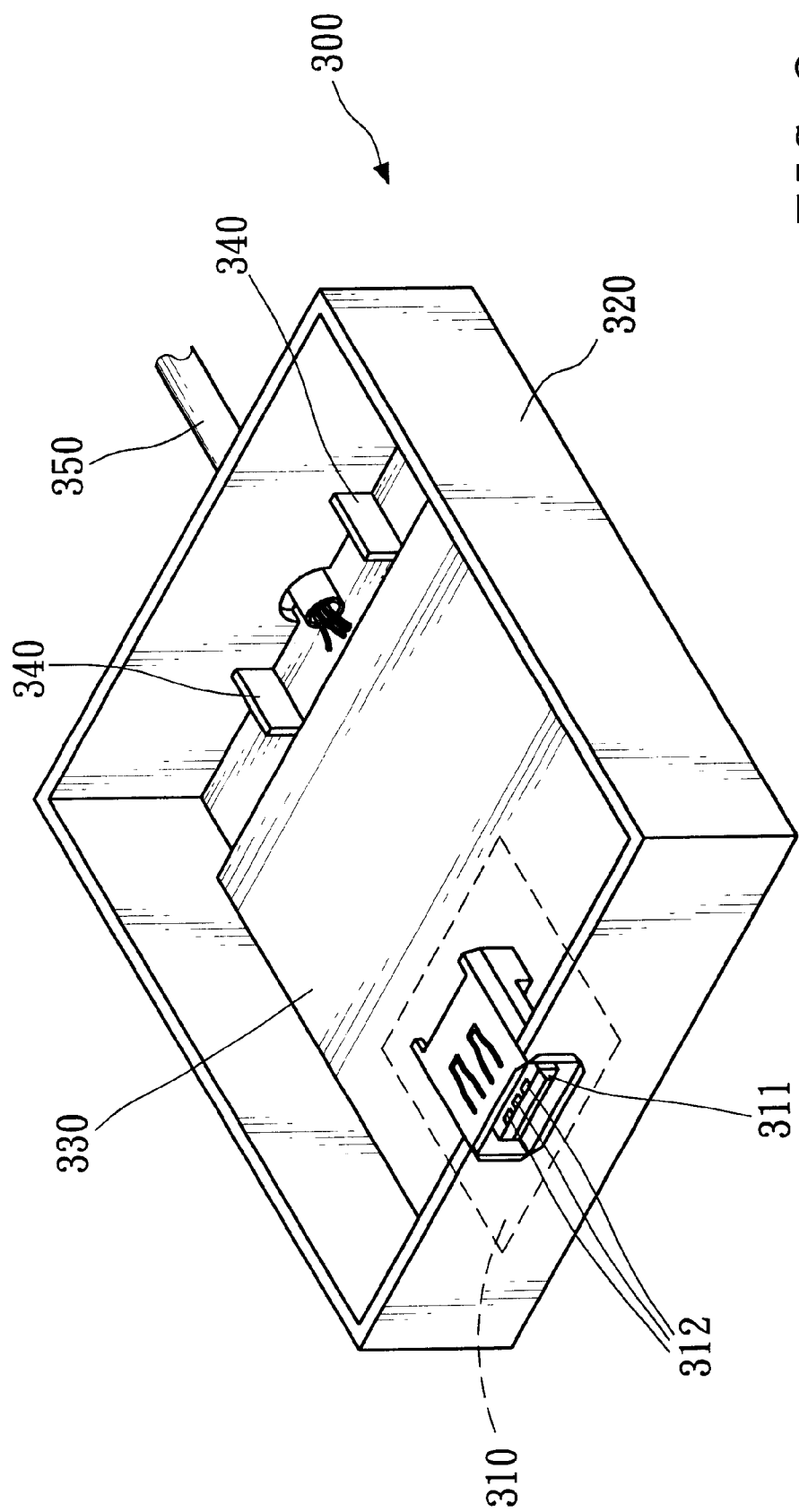
FIG. 3 is a perspective view of this invention.

Referring to FIG. 3, the connection box 300 according to this invention bordered by side walls 320 in which an enhanced signal circuit 330 is located and held steadily by holding ridges 340 extending from a side wall at one end. In the side wall between the holding ridges 340, there is an opening for a cable 350 to pass through and wiring with the enhanced signal circuit 330 for signal transmission. At another end of the enhanced signal circuit 330, there is a 1394 type plug 310 which has a terminal board 311 upon which a plurality of terminal ends 312 are provided for signal transmission.

Figure 4:
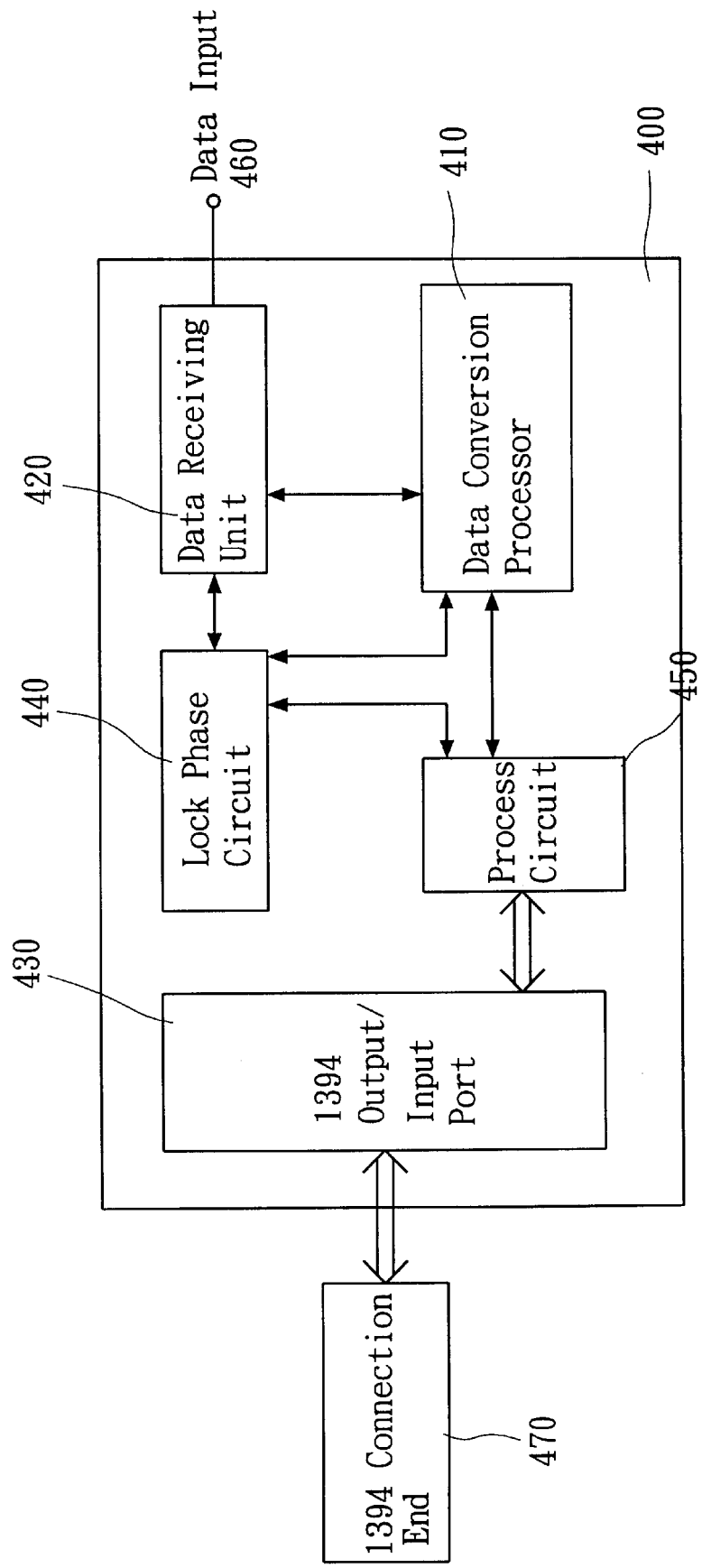
FIG. 4 is a circuit block diagram of this invention.

Referring to FIG. 4, the enhanced signal circuit 330 has built-in interconnecting elements which includes a data conversion processor 410, a data receiving unit 420, a lock phase circuit 440, a process circuit 450, a data receiving unit 420 and a 1394 output/input port 430. When in use, the data receiving unit 420 receives data and signal input 460 from the cable 350 (FIG. 3) and forwards them to the data conversion processor 410 and lock phase circuit 440. The data and signal are converted and boosted, and forwarded to the process circuit 450 which may includes a plurality of linking resistors and capacitors for selected processes, including lock phase process in the lock phase circuit 440 for linking various peripheral device. The processed data and signal then be transmitted to the 1394 output/input port 430 and then output to a 1394 connection end 470.

Figure 5:
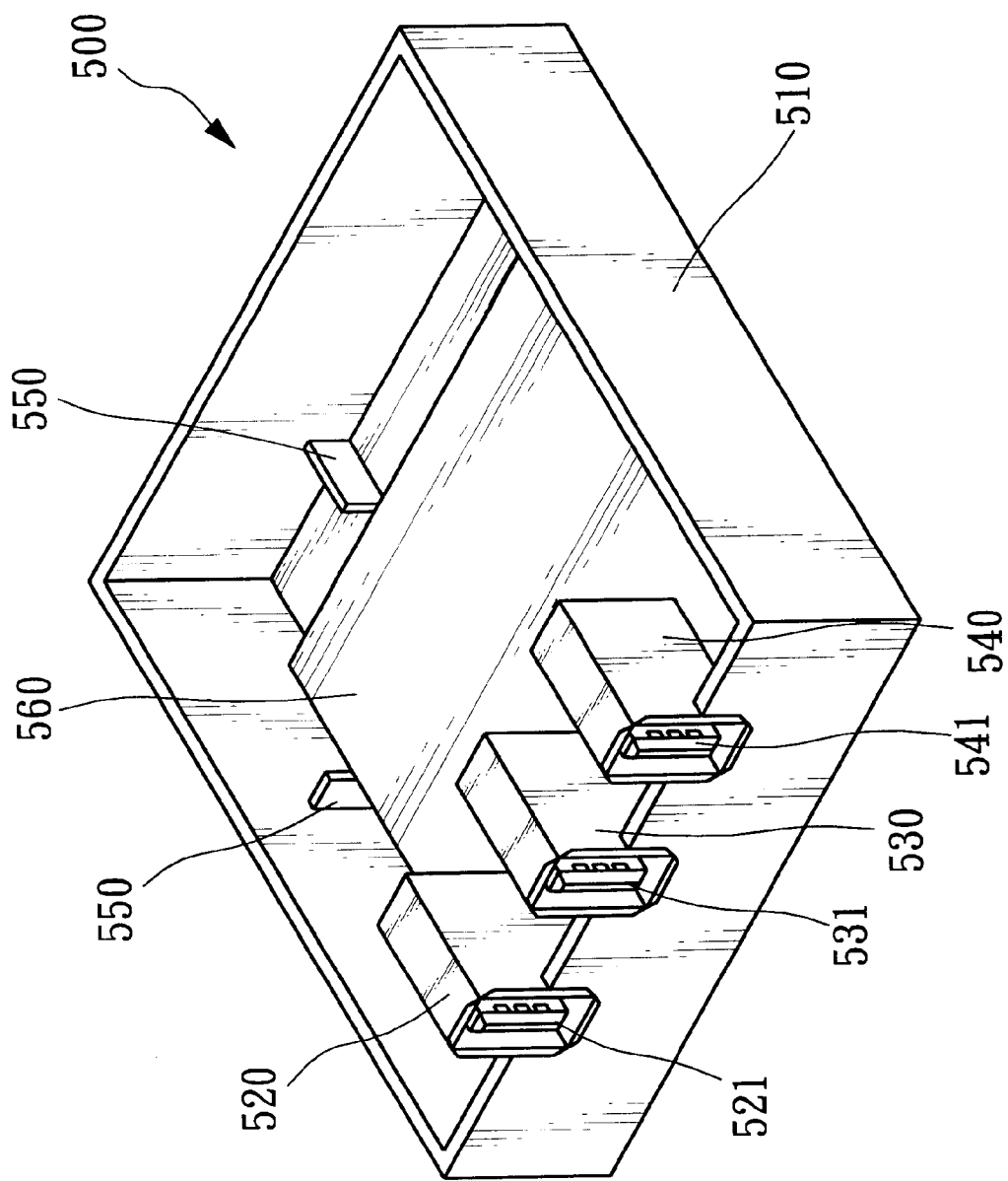
FIG. 5 is a perspective view of another embodiment of this invention.

FIG. 5 shows another embodiment of the invention which is largely constructed like the one shown signal in FIG. 3. The connection box 500 has an enhanced signal circuit 560 held by the holding ridges 550 extending from the side walls 510. At one end of the circuit 560, a plurality of 1394 type plug are provided, including a first plug 520 which has a first terminal board 521, a second plug 530 which has a second terminal board 531 and a third plug 540 which has a third terminal board 541 located therein. The enhanced signal circuit 560 is generally constructed like the one shown in FIG. 4. However in the 1394 output/input port 430, more than one plug (i.e., 520, 530 and 540) are located there in for transmitting signals to a plurality of devices.

By means of this invention, the receiving signal may be converted and boosted and transmitted through the 1394 type connection ends to various devices located at a long distance without suffering signal diminishing problem. The connection box may also has a cover to protect the circuit and components inside, and to facilitate mounting and installation.

It may thus be seen that the objects of the present invention set forth herein, as well as those made apparent from the foregoing description, are efficiently attained. While the preferred embodiments of the invention have been set forth for purpose of disclosure, modifications of the disclosed embodiment of the invention as well as other embodiment thereof may occur to those skilled in the art. Accordingly, the appended claims are intended to cover all embodiment which do not depart from the spirit and scope of the invention.

What is claimed is:

1. A connection device for connecting a plurality of external peripheral devices comprising:
   a) a connection box having an interior defined by a plurality of walls;
   b) at least one 1394 type plug;
   c) a cable; and
   d) an enhanced signal circuit connected to the interior of the connection box, the enhanced signal circuit having:
      i) a data receiving unit electrically connected to the cable;
      ii) a data conversion processor electrically connected to the data receiving unit;
      iii) a lock phase circuit electrically connected to the data receiving unit, the lock phase unit linking the plurality of external peripheral devices;
      iv) a process circuit electrically connected to the data conversion processor and the lock phase circuit; and
      v) a 1394 output/input port electrically connected between the at least one 1394 type plug and the process circuit, wherein, the enhanced signal circuit converts and boosts 1394 type signals coming from a first external peripheral device connected to the 1394 type plug into signals that are compatible with a second external peripheral device connected to the cable, and the enhanced signal circuit converts and boosts signals received from the second external peripheral device into signals that are compatible with the first external peripheral device, such that the first and second peripheral devices perform bi-directional intercommunications with boosted signals.

2. The connection device for connecting a plurality of external peripheral devices according to claim 1, wherein the connection box has a plurality of holding ridges, each holding ridge having a first end connected to one of the plurality of walls on the interior of the connection box and a second end engaging the enhanced signal circuit to connect the enhanced signal circuit to the connection box.

3. The connection device for connecting a plurality of external peripheral devices according to claim 1, wherein the second external peripheral device connected to the cable is a computer.

4. A connection device for connecting a plurality of external peripheral devices comprising:
   a) a connection box having an interior defined by a plurality of walls;
   b) an enhanced signal circuit connected to the interior of the connection box, the enhanced signal circuit having:
      i) a data receiving unit;
      ii) a data conversion processor electrically connected to the data receiving unit;
      iii) a lock phase circuit electrically connected to the data receiving unit, the lock phase unit linking the plurality of external peripheral devices;
      iv) a process circuit electrically connected to the data conversion processor and the lock phase circuit; and
      v) a 1394 output/input port electrically connected to the process circuit; and
   c) a plurality of 1394 type plugs electrically connected to the enhanced signal circuit, wherein, the enhanced signal circuit converts and boosts 1394 type signals coming from the plurality of external peripheral devices connected to the plurality of 1394 type plugs such that the plurality of external peripheral devices perform bi-directional intercommunications with boosted signals.

5. The connection device for connecting a plurality of external peripheral devices according to claim 4, wherein the connection box has a plurality of holding ridges, each holding ridge having a first end connected to one of the plurality of walls on the interior of the connection box and a second end engaging the enhanced signal circuit to connect the enhanced signal circuit to the connection box.

6. The connection device for connecting a plurality of external peripheral devices according to claim 4, wherein each of the plurality of 1394 type plugs has a terminal board.

* * * * *